United States Patent [19]
Atkinson

[11] Patent Number: 5,991,883
[45] Date of Patent: Nov. 23, 1999

[54] POWER CONSERVATION METHOD FOR A PORTABLE COMPUTER WITH LCD DISPLAY

[75] Inventor: Lee Atkinson, Houston, Tex.

[73] Assignee: Compaq Computer Corporation, Houston, Tex.

[21] Appl. No.: 08/685,093

[22] Filed: Jul. 23, 1996

Related U.S. Application Data

[60] Provisional application No. 60/019,613, Jun. 11, 1996, and provisional application No. 60/019,108, Jun. 3, 1996.

[51] Int. Cl.[6] ............................................. G06F 1/00
[52] U.S. Cl. .................... 713/300; 713/320; 713/322; 713/340; 345/509; 707/526
[58] Field of Search ................. 395/750.01, 375, 395/800, 750.04, 750.08; 371/66; 707/526; 345/509

[56] References Cited

U.S. PATENT DOCUMENTS

| | | | |
|---|---|---|---|
| 5,136,695 | 8/1992 | Goldshlang et al. | 345/509 |
| 5,167,024 | 11/1992 | Smith et al. | 395/375 |
| 5,218,607 | 6/1993 | Saito et al. | 371/66 |
| 5,369,771 | 11/1994 | Gettel . | |
| 5,392,438 | 2/1995 | Gunji | 395/750 |
| 5,442,800 | 8/1995 | Okamura | 395/800 |
| 5,465,367 | 11/1995 | Reddy et al. | 395/750 |
| 5,524,249 | 6/1996 | Suboh | 395/750 |
| 5,537,650 | 7/1996 | West et al. | 395/750 |
| 5,560,024 | 9/1996 | Harper et al. | 395/750 |
| 5,572,655 | 11/1996 | Tuljapurkar et al. | 395/788 |
| 5,615,376 | 3/1997 | Ranganathan | 395/750 |
| 5,619,707 | 4/1997 | Suboh | 395/750 |
| 5,625,826 | 4/1997 | Atkinson | 395/750 |

OTHER PUBLICATIONS

Advanced Power Management (APM) BIOS Interface Specification, Revision 1.2, Feb. 1996, Intel Corporation, Microsoft Corporation.

Power Management Coordinator API Specification, Revision 1.00, Apr. 8, 1994, Intel Corporation.

Volkman, Victor R. "Advanced Power Management for DOS" Developer's Preview, Jul. 1992, pp. 19–23.

Caruthers, Frank, editor, "Battery–Management Circuitry Gets Smarter" Computer Design's OEM Integration, May 1994, pp. 15–18.

Primary Examiner—Ayaz R. Sheikh
Assistant Examiner—Eric S. Thlang
Attorney, Agent, or Firm—Robert Groover

[57] ABSTRACT

A system and process for power conservation in a portable computer system. When the application or hardware in use allows for reduced video performance, the refresh rate of the video graphics controller is reduced to a level which allows practical use of the display but consumes much less power than a normal mode.

47 Claims, 2 Drawing Sheets

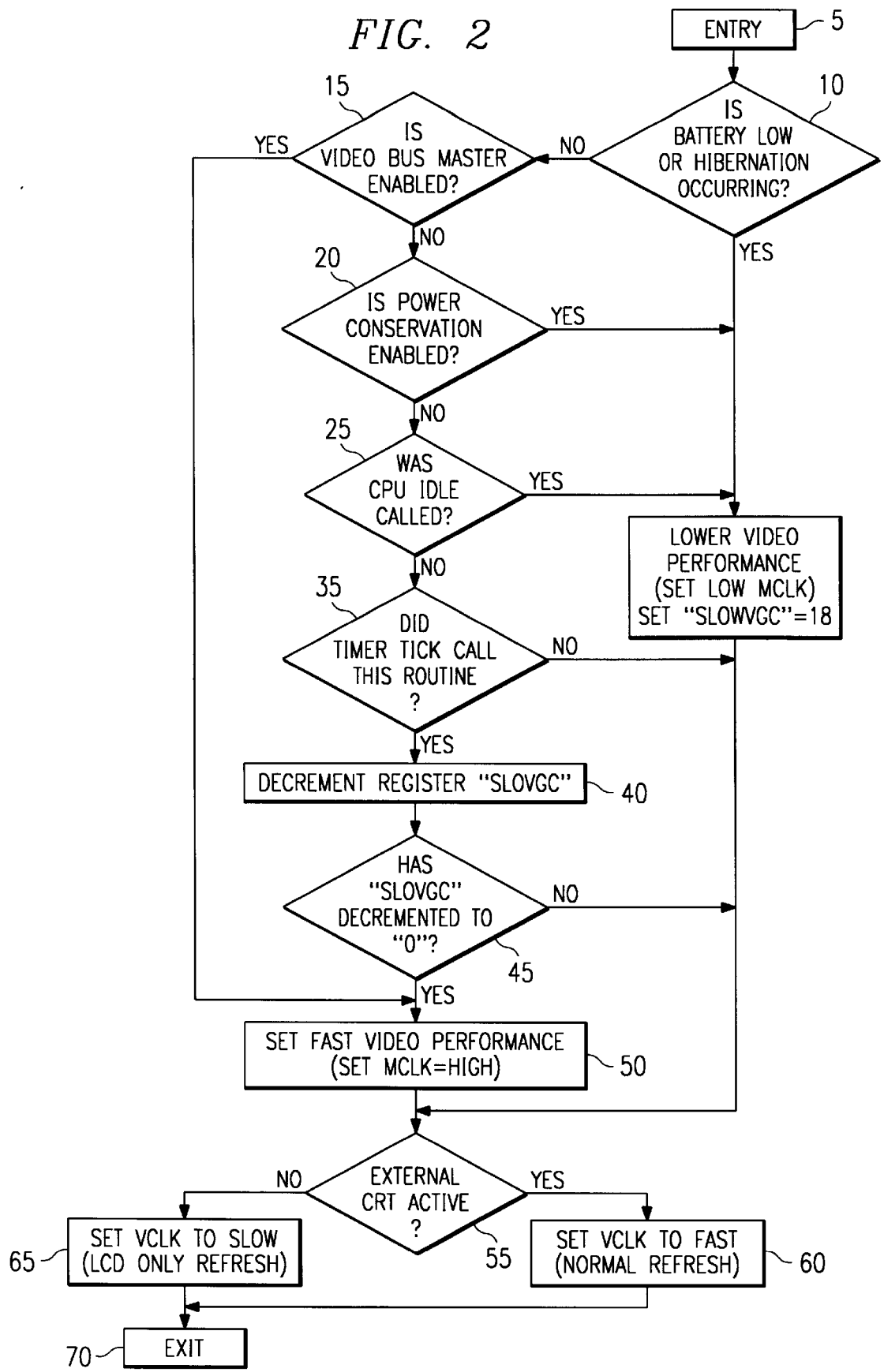

POWER CONSERVATION METHOD FOR A PORTABLE COMPUTER WITH LCD DISPLAY

This application claims priority from provisional application Ser. No. 60/019,108 filed Jun. 3, 1996 and provisional application Ser. No. 60/019,613 filed Jun. 11, 1996.

BACKGROUND AND SUMMARY OF THE INVENTION

This application generally relates to power management in portable computers, and more specifically to a computers with power-conserving display systems.

BACKGROUND

Power Management for Portable Computers

A portable computer is typically a self contained unit which may operate under battery power, and may be called by any number of names, such as laptop, notebook, palmtop, etc. One of the most important criteria for a portable computer user is operational time under battery power. Time management is critically important, since when the battery of a battery-powered computer is exhausted, the user is essentially "stranded." Thus, users place great emphasis on the operating lifetime of portable computers, and many strategies have been used to extend the operating lifetime which can be achieved for a given amount of battery energy.

A common element of many strategies is to selectively power down certain elements of the system when the system is idle. Therefore, many smart systems have been used to detect various conditions which would indicate a standby mode, and to initiate power down or reduced power modes of operation for different elements. See generally the Advanced Power Management (APM) specification, which is hereby incorporated by reference.

Display-Related Power Management

Many functional techniques have been applied to reduce the power consumption of various components of the portable computer; the central processing unit can be slowed or stopped, or peripherals may be turned off when not used. However, to date the only techniques used to decrease the power required by the video subsection have involved turning off functions; for the LCD panel, such techniques include screen blanking (turning off the panel entirely after a measured inactivity of the CPU) or decreasing the overall screen brightness (dimming the screen when under battery power). Each of these techniques produce non-functional or ergonomically compromised operation.

The LCD screen is unique among the different components of the portable system in that it is the only component that normally stays active whenever the system is being used (unless a secondary display is used); unlike components such as hard disk drives, it cannot be powered down momentarily and then powered back up when the periodic need arises, while allowing the user to continue to work at the same time. Therefore, the LCD screen normally has only two distinct states when the system as a whole is powered on. A first active state, which has a full refresh rate, is used under conditions when there is abundant power or when the application requires a high refresh rate, such as in graphics animation. A second state, which is a full suspend mode in which the screen state is frozen and the screen is powered down and any lighting removed, is used to preserve battery power when the screen is not needed. Therefore, the user is left with a choice of either using the display at full power or not using the system at all.

The CRT was the original display for desktop computers, and is still the most popular by far. CRTs require a high refresh rate because the phosphor used for their displays generally has a short persistence; slow refresh rates result in dim and/or flickering displays for a CRT. However, the persistence of the available LCD display today is extremely long, over 20 milliseconds. The transition from CRTs to LCDs as a display technology carried over the fast (56–75 Hz) refresh rates of the CRT, with the result that the LCD is "over refreshed" when used alone (not simultaneously with a CRT). A great deal of power (typically about 10%) of the entire portable computer's power budget today goes to the LCD panel logic only.

One strategy for power management which has been followed in the past is to power down the LCD display while freezing its state. The LCD display is inherently fairly power efficient—much more so than a CRT display—but nevertheless does consume a significant amount of power if the backlit illumination is turned on, and also consumes an amount of power which is dependent upon the frequency of refresh.

Video Graphics Controller Performance

Since the advent of super VGA standards, a substantial amount of progress has been made in providing at least the option of displays with a higher refresh rate for a given resolution. Thus, many graphics controllers permit the refresh rate to be specified as well as the parameters.

The Multimedia and motion-video applications targeted by today's notebook computers require tremendous amounts of Video graphics controller performance. One way to get this performance is to increase the operational frequency of the Video graphics controller engine and memory interface. However, the high performance settings required for multimedia applications compromise the power requirement for the notebook computer when running "business" applications (word processing or spreadsheet usage); the higher clock rates and greater Video section transistor count (2 megabytes of DRAM now allotted for the video only) mean greater power consumption and shorter battery life.

External CRT Activation Precludes Refresh Reduction

CRTs require a fast, "normal" refresh rate of 56–75 Hz minimum, and today's generation of graphics controllers support only "synchronous dual" output to both the CRT and LCD; this means that both the CRT and the LCD must share the same refresh rate and video timings. If the internal LCD is a 640×480 resolution, it will only simultaneously display to a CRT if the CRT is also displaying 640×480 resolution and at the same refresh rate. In the present generation of video controllers, the CRT and LCD are clocked at the same rates. Because of this, typical notebook PCs today always operate at "fast" refresh rates, and a change in refresh rate for any reason is only incidental.

Innovative Power Conserving Method & System

The present application discloses a method and system for reducing the power consumption of an LCD display. The first element of this innovative approach to video power management decreases the operational power of the LCD panel itself without compromising screen brightness or screen function. The principle of this is to detect when the LCD only is being displayed (an external CRT is not being used) and to lower the refresh rate of the internal panel to save power.

A second element of the power conservation is a method for detecting whether a power conservation mode is enabled, and slowing down the Video Graphics Controller ("VGC") engine when high performance is not required. This innovative method recognizes that video performance need not exceed the application requirements. For example, playing an MPEG movie requires high performance video, but word processing, electronic mail, or spreadsheet use does not. A method for automatically configuring appropriate refresh rates for the VGC according to system and application requirements can result in significant reductions in power consumption. The conservation method may be enabled or disabled depending on whether a CRT is active, on whether any Bus mastering video device is active, and on the amount of CPU activity to change the refresh rate and performance clocking of the video subsection.

An innovative feature of this technique is the ability to sense whether an external CRT is being used, and to switch from "slow" to "normal" refresh rates accordingly. "Slow" refresh rates may be less than 50 Hertz, "normal" refresh rates are typically from 56 to 75 Hz, or higher. "Slow" refresh is usually performed by lowering the Pixel clock rate via registers in the VGC. Accompanying the slower pixel clock may be a reduction in the panel voltage itself; this method allows the voltage of the panel to be lowered when slower refresh rates are permitted. Halving the refresh rate saves approximately half of the display power consumption directly. This invention changes refresh to slow rates (less than 50 Hz and generally 30–40 Hz) when the output is only being sent to the LCD display.

Another important feature of the disclosed inventions is they take advantage of capabilities that are already present in typical computer systems. Today's portable computer systems generally include some sort of power management features, and most modern video controllers allow several different refresh rates to be used. This application provides an innovative method and system to take advantage of these capabilities, to provide for greatly reduced power consumption when high performance video is not required.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 2 shows a flowchart of the process of the presently preferred embodiment.

DETAILED DESCRIPTION OF THE PREFERRED EMBODIMENTS

Figure 1:
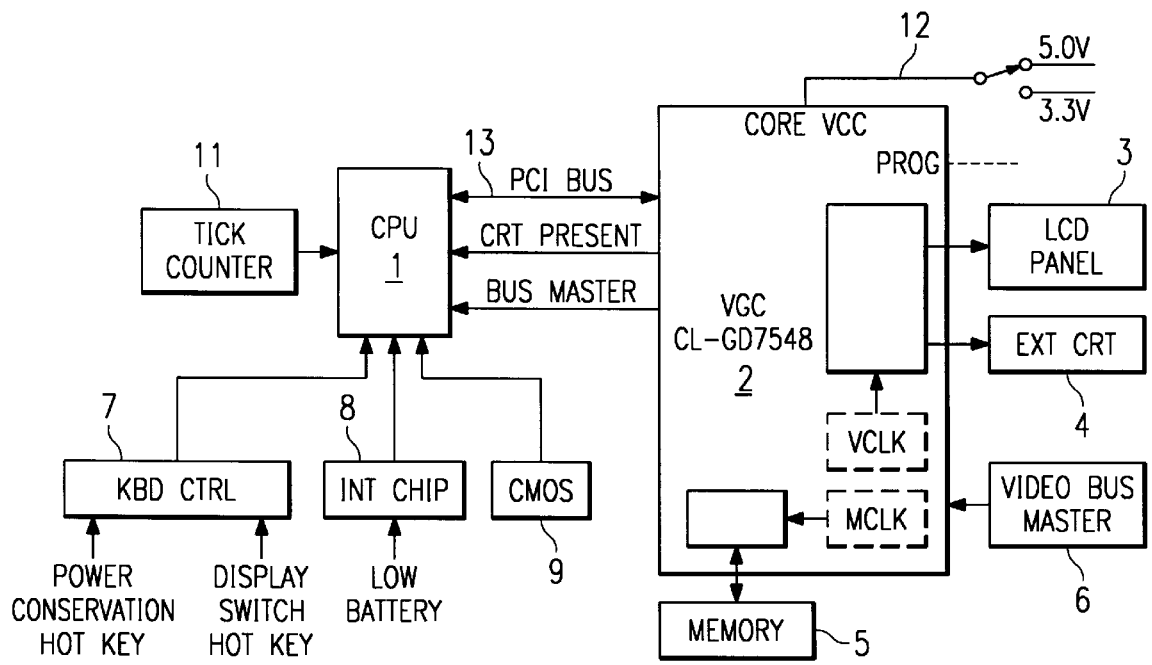
FIG. 1 shows a block diagram of a portable computer system according to the presently preferred embodiment.
Figure 3:
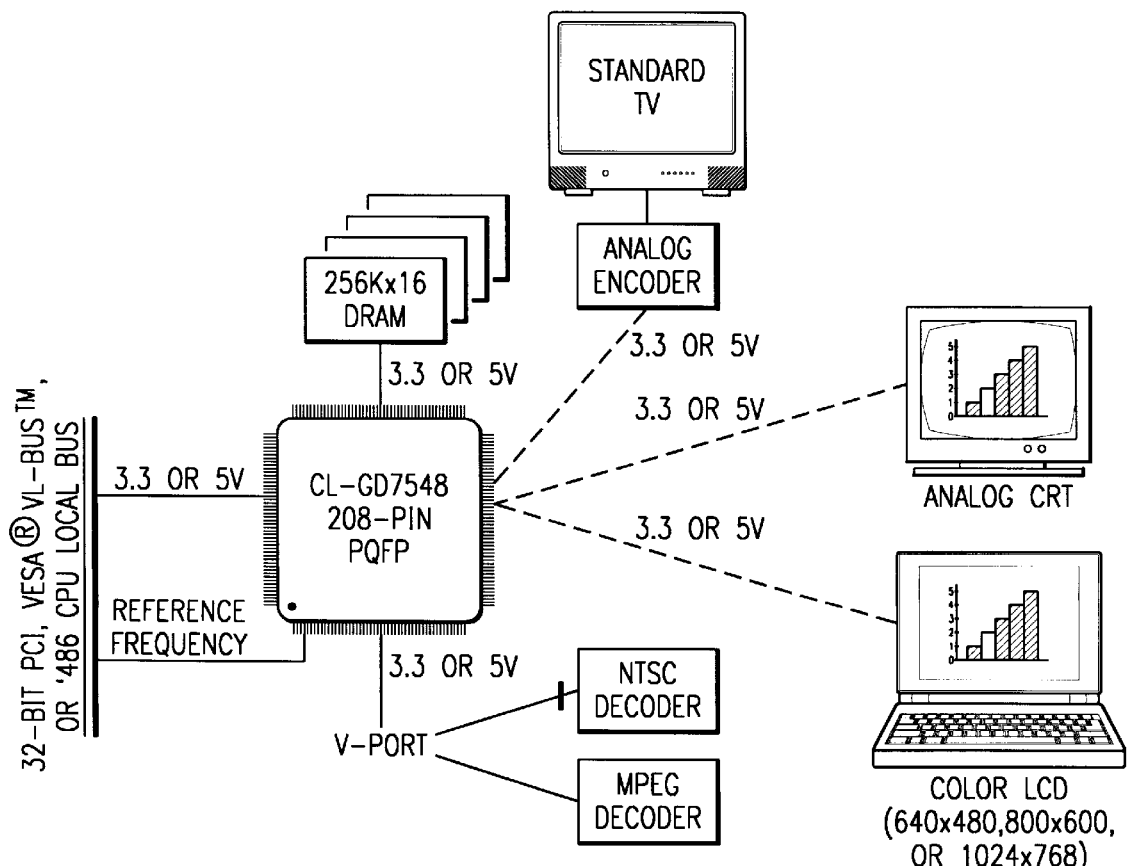
FIG. 3 shows a functional block diagram of the use of the Cirrus Logic CL-GD7548 graphics controller in implementing the presently preferred embodiment.

The numerous innovative teachings of the present application will be described with particular reference to the presently preferred embodiment (by way of example, and not of limitation). The basic system and innovative method will first be described, followed by a description of a typical embodiment of the innovative system. Finally, the presently preferred embodiment will be described in even greater detail.

Innovative Display-Power Control System

The method and system of the presently preferred embodiment provides for Video graphics subsystem power management through a control relation that considers and sets an appropriate video performance level and refresh rate depending on whether any of the following are true:

a. the battery is nearly empty (a Low battery condition exists).

b. the unit is undergoing a "hibernation to disk."

c. a power conservation mode is enabled.

d. the CPU is under full utilization or is idle, to predict required video performance levels; or the algorithm can consider the frequency of accesses to the video controller itself to determine whether to increase or decrease performance.

e. an application is operating, or "video master" hardware exists that requires full (not compromised) engine speed.

f. an external CRT is being driven that requires full video refresh performance.

These six conditions will now be discussed with relation to FIG. 2.

A. Decrease Performance if Battery is Low

B. Decrease Performance if Hibernation to Disk is Occurring

A low battery event may jeopardize data or result in lost work. If a Low battery condition is determined, the performance of the video subsystem is decreased so that the user can prepare to save work or idle the machine. "Hibernation to disk" is the storage of the complete state of the machine to the hard drive, so that the state of the computer may be retrieved after a complete power-off of the machine. Hibernation to disk may also be self-initiated by the machine itself (upon reaching a low battery condition) or through manual actuation. In either case, the available battery power left to perform the storage may be critical. Hibernation to disk is speed-limited by the hard disk system, and so high graphics performance is not required during the hibernation event.

To help assure reliable closing and storage of the computer's state, the innovative method considers whether the battery is at a critically low value, or if a hibernation to disk is occurring (FIG. 2, step 10). In the preferred approach, a Low battery "1" condition is detected by an analog comparator in the interface chip 8 (of FIG. 1) when the main battery charge drops below 10% of maximum charge. The output of the comparator generates a System Management Interrupt (SMI). The SMI interrupts the CPU and executes from System BIOS before returning control of the system to the operating system or application. The BIOS and SMI code will force the video performance to "low."

Hibernation to Disk may be initiated by a very-low battery condition, often called a "Low battery 2" condition, in which the battery voltage indicates that the battery is operating at only 6% of its maximum charge. Hibernation may also be entered manually, such as by a Hot key. Either event triggers a System Management interrupt. According to a preferred embodiment, the video controller performance rate is lowered immediately after the System management code is initiated.

C. Detection of a Power Conservation Mode

A power conservation mode may be set which defaults to "low performance" video. Typically, a user may set different default conditions for power conservation, so that the system always operates at lower power when under Battery power than when operating under AC power.

The methods available to manually set up a power conservation mode are very well known to laptop users. Power conservation modes are usually enabled manually by the user and stored in memory that the CPU can read. The algorithm considers the power conservation settings before reducing the performance of the CPU (FIG. 2, step 20).

In a preferred system context, power conservation settings are accessible in a ROM-based SETUP routine that is available at boot. A menu drive setup is offered, with a section available for the user to customize select power conservation settings of HIGH, MEDIUM, CUSTOM, or OFF. These settings relate to timeouts for the hard drive, LCD dimming, etc. The preferred setting is stored in a memory location accessible by the CPU. These settings provide the CPU the timeouts used for turning off or slowing down the hard drive, screen brightness, or CPU speed during normal operation.

In this embodiment, any power conservation besides "off" will enable Video power conservation. Power conservation can be turned "off" or "on" at any time after boot. This may be done with a "hot key," a special keying function that interfaces to the "system" level of the PC (accessed by typing "Fn+F7" on a Compaq laptop), or through a setting in a program; for Microsoft Windows based Operating systems, power conservation is typically enabled through the "power management" Icon under "control panel."

D. Monitoring CPU activity to throttle VGC speed

"Advanced Power Management" (APM) is commonly used on laptop computers reduce CPU power consumption. APM operates by monitoring the CPU status or "Event" frequency (typically keystrokes) and slowing down the CPU if the application is in a "wait" or "idle" state. APM is effective at reducing the CPU power, but there has not been any practical association of CPU requirements with the Video graphics.

Generally, CPU requirements and VGC performance go together; applications such as games or Video codecs, e.g. using software MPEG implementation, that require extensive amounts of CPU performance also require high video performance. Generally, correlating CPU utilization and Video performance makes sense. Video performance could also be made to dynamically change according to changes in the CPU power.

Several possible methods can be used to trigger a slow down in the video performance:

An operating system typically issues a "CPU IDLE" call to the system BIOS when the processor itself may be slowed down. The CPU will then be slowed (e.g. the operating frequency of the CPU may be halved) or completely stopped, until a system event (e.g. a keystroke, timer tick, or interrupt) "wakes" up the system. "IDLE" status is typically initiated by the operating system when the underlying applications do not require CPU power.

A second possible method of throttling the Video graphics chip is to monitor writes directly made to the VGC, and dynamically speed up or slow down the graphics performance. In this method, hardware is added in the form of a counter that indexes whenever an access is made to the graphics controller. Periodically, the CPU would read this counter to measure the average video utilization, then speed up or slow down the video clock.

A third method of monitoring video performance is to index a register every time that a call is made to an Operating system function that performs a graphics function.

Periodically, the CPU would poll that register and decide to speed up/slow down the VGC. The higher the number of counts, the faster the VGC would be sped up.

In the presently preferred embodiment, video performance is correlated with CPU performance. If the operating system performs a "CPU IDLE" call, the Video Graphics performance will be set to "low" along with the traditional lowering of the CPU performance (FIG. 2, step 25).

The presently preferred embodiment also provides a means to speed the video graphics controller back up to normal speed. In this embodiment, the Video Graphics controller is returned to full performance if no CPU idle occurs within a certain time. Specifically, if no CPU IDLE call is detected for 1 second (18 interrupts from the "tick" counter) and the VGC is set to "slow" performance, then the VGC will automatically be sped up to "full" performance automatically.

Every time a CPU IDLE call is made, a register "SLOVGC" is set to 18.

Every tick counter interrupt will decrement the value of the "SLOVGC" by 1 (FIG. 2, step 40).

If the register is reduced to "0," the performance mode of the VGC is set to FULL (FIG. 2, steps 45 and 50).

E. Intervention by an Application that Requires High CPU Performance

Some applications will require full video graphics performance, and will not operate correctly with the VGC operating at reduced performance. A memory bit (readable by the algorithm) may be set by an application, or detected by the operating system, so that the reduced power mode is disengaged. The application would have to be written to communicate to the algorithm if it requires extra performance. Usually, drivers for applications like MPEG decode or video playback are custom made.

Hardware that performs "video mastering" may exist in the computer. This hardware may typically be a video decoder that requires full Video Graphics subsystem performance and writes directly to the Video graphics controller circuitry directly. The algorithm may identify that such a piece of hardware exists and not allow reduced performance.

In the presently preferred embodiment, a bus mastering function (e.g. a "Zoom Video" card or MPEG adapter, either a video-mastering device) must interface through a system level call (specifically, an INT 15 call). The device registers itself by forcing a setting in CMOS, and acts to disable video power management (FIG. 2, step 15). "Registration" occurs through the INT 15 call to enable the bus-master function (Video power conservation is set off) or to disable the Bus master function (video power conservation can be set ON).

In a typical system with 60 Hertz refresh of a 1024 by 768 pixel LCD, the required pixel clock is approximately 65 MHz, and the VGC requires a panel supply voltage of 5 volts. Running at 32 MHz pixel clock and 30 Hz refresh uses only about 25% of the higher-performance refresh power. In a typical system, the total savings (including a lowering of the video graphics chip voltage) is about 2.5 watts.

F. An External IT is Being Driven that Requires Full Video Refresh Performance.

As described above, conventional CRT screens, by their nature, require a relatively high refresh rate. Therefore, if an external CRT is activated, full video refresh must be restored (FIG. 2, steps 55, 60, and 65). If an external CRT is attached to the VGA output of a typical Compaq portable computer, it may be activated by the hot-key (Fn+F4), and the refresh rate would be restored at that point.

Methods to detect that an external CRT is connected to the laptop's external VGA connector are well known and commonly implemented. Also common to laptops are provisions to switch between LCD only, CRT only, and simultaneous operation of CRT and LCD.

Typical Hardware Configuration of a Portable Computer with an LCD display

FIG. 1 below shows the hardware pieces typically used in impementing a portable computer according to the present invention.

The CPU 1 is typically (as of 1996) a Pentium microprocessor with memory. Operating System software (e.g. Windows 95 or MS-DOS) manages application programs that are run within it, or the CPU can execute "system level" software by making program calls to the BIOS (Basic Input/Output System) routines stored in a non-volatile memory. The algorithm described for the presently preferred embodiment is typically executed from BIOS ROM.

The VGC 2 (Video Graphics Controller), typically connects to the CPU over a PCI bus 13. The CPU 1 can set memory or I/O registers inside the VGC 2. In the presently preferred embodiment, a Cirrus Logic CL-GD7548 device is used as the VGC 2. The Cirrus Logic CL-GD7548 data sheet is herein incorporated by reference.

An LCD display panel 3 is attached to the laptop computer in the presently preferred embodiment. Typically, the connection from the VGC 2 to the LCD 3 is over a digital bus.

An external CRT 4 (or other external display device) may be connected to the output of the laptop. Typically, the connection between the CRT and the VGC is across an analog "RGB" bus.

The VGC interfaces directly to memory 5. This local memory typically VRAM, is called the "frame buffer" and holds the fonts, graphics, or text that is actually output to the display. The speed of the memory interface is controlled by the internal oscillator MCLK, whose frequency is programmable through an I/O location available to the CPU.

The speed of the "pixel clock" (the rate that of progression from pixel to adjacent pixel) is determined by the internal oscillator VCLK. VCLK is accessible by the CPU through an I/O register in the VGC, and directly affects the refresh rate of the LCD or CRT displays.

Optionally, a video bus-mastering device 6 may be present. The video bus master is typically an MPEG decoder, video conference decoder, Video capture card, etc., that can write directly to the frame buffer memory 5 without putting data across the PCI bus 13 itself.

A keyboard controller chip 7 interfaces with the CPU. Usually, the keyboard controller, an Intel MCS-80C51SL in the presently preferred embodiment, will scan the keys (for an internal or external keyboard) and notify the CPU (via an interrupt) of a key press. When an external CRT is connected, the external CRT may be turned on with a "hot key" function. Usually, toggling a hot-key will sequence between LCD-only display, LCD and CRT display (simulscan mode), or CRT-only display. For Compaq laptops, typically this function is accomplished by simultaneously hitting the "Fn" key and "F4" at the same time. Power conservation may also be enabled or disabled with a hot-key (for Compaq laptops, through Fn +F7).

An interface chip 8 may interrupt the CPU at any time if battery voltage drops below certain thresholds, as a way of alerting the system to a low or critically low power supply condition. In this presently preferred embodiment, the interface chip is a 4-bit microcontroller with internal A/D, Compaq Computers part number TMP47P440. The interface chip periodically measures the voltage across the internal Battery supply and will send an interrupt to the CPU if the voltage is low.

CMOS 9, in this context, is a generic description for a non-volatile memory readable/writable by the CPU, which may use battery-backed CMOS, flash ROM, or other technology. For implementing the present inventions, CMOS may hold customer-preferred power conservation settings (such as "power conservation off," on "low" setting, on "high" setting, etc).

The VGC, in the presently preferred embodiment, may operate at either of 2 voltages, depending on the setting of the PROG pin. The higher voltage may be required for very high refresh rate or memory interface rates are chosen. The PROG pin controls a voltage switch 10 (typically, complementary FETs) so that a "1" on the pin sets the core VCC to 5 volts.

A periodic counter 11 interrupts the CPU. This "tick counter" operates at approximately 18 Hz and is used to update the internal real time clock of the operating system. For this invention, the tick counter is used to monitor the frequency of CPU "idle" activity and to speed up the video performance if there is little or no CPU slowdown directed by the operating system.

Sample Implementation of the Innovative Method on a Typical Portable Computer

The following describes the presently preferred implementation of the innovative method of the present application. The preferred embodiment is presently the Compaq LTE5000 notebook computer using a Cirrus Logic 7548 Video graphics controller chip.

Trigger Events for the Power Conservation Device

The entry points for the power reduction system are (see FIG. 2):

1. When POST (power on self-test) initializes the CPU.
2. A Low battery condition exists. (10)
3. A "hibernation to disk" is initiated. (10)
4. A power conservation mode is enabled or disabled. (20)
5. An application or "video master" device registers that requires full video performance. (15)
6. When a "CPU IDLE" or "CPU BUSY" APM command is issued from the operating system. (25)
7. Whenever the "tick counter" interrupts the CPU. (35)
8. An external CRT is attached or activated. (55)

Other "indirect" events usually use one of the above entry points; for example, power conservation may automatically be disabled when the user attaches AC power. In that case, either the operating system or the system BIOS may call for an APM enable/disable, which will inherently correct the video refresh and performance rates.

POST Initialization

"POST" stands for "Power On Self-Test" and refers to the CPU operation during Turn-on and the initialization code the system executes when power is turned on to the system. POST will typically read CMOS and restore custom-settings the user has configured. If POST detects that a power conservation mode is enabled, no external CRT is enabled, and the battery condition is not low or critically low, the minimum graphics performance mode and minimum refresh rate are selected.

Programming the Cirrus Video Controller Chip for Low Power

Bits to Flip for Refresh Rate or Performance

There are 3 elements under software control that control the video performance and refresh rate; the core voltage, VCLK control, and MCLK control. BIOS alone will be allowed to set the performance of the VGC as "low" or normal." Any operating system drivers must make sure that they do not interfere with the operation of BIOS.

Refresh rate alone is modified by changing the Video clock (VCLK). The performance of the system may be changed through the Memory clock (MCLK).

The video controller core voltage can also be changed for best power conservation. The core voltage, in the presently preferred embodiment, must be high (5 volts for the 7548 device) when MCLK is at full speed, and is lowered (to 3.3 volts) when video performance is lowered (by lowering the MCLK to below 50 MHz).

Setting Low-Power Conservation Modes

Once the BIOS routine has determined that it may enable the low power mode (either low refresh or low performance) it must program the Video graphics controller chip.

Setting Refresh Rate

At any given resolution, the refresh rate is determined by the total number of dots (for instance, 480,000 in an 800× 600 "SVGA" display) plus the front and rear "porch" ("null" areas used before and after valid data in each frame) times the refresh rate. Typical associations for Vclk to a 60 Hz refresh rate at different resolutions are:

640×480 (VGA) at 60 Hz refresh ---> VCLK of 25 MHz
800×600 ("SVGA") at 60 Hz refresh ---> VLCK of 40 MHz
1024×768 (Hi resolution) at 60 Hz refresh ---> VCLK of 65 MHz Four selections of VCLK can be programmed at once in the Cirrus Video controller. Only 1 of these registers is used at one time. The register pairs SR0B and SR1B, SR0C and SR1C, SR0D and SR1D, and SR0E and SR1E determine the four possible VCLK rates. The register MISC (bits 3,2) selects which one of these register pairs will be used to determine the present refresh rate.

For conventional systems, only 3 of the 4 register sets are necessarily used (for support of 640×480, 800×600, or 1024×768 modes). Registers SR0B/SR1B, SR0C/SR1C, and SR0D/SR1D have been used before for LCD-only, "simulscan" modes (display to an external CRT with the internal LCD enabled), or CRT-only display. For instance, to display an image to the CRT and to the LCD at one time in 640×480 (VGA) mode, set register MISC[3,21] to a 00 so that register pair SR0B/SR1B is used for the VCLK speed. Likewise, register SR0C/SR1C held the correct VCLK when 800×600 resolution mode is used, and SR0D/SR1D were used for display of a 1024×768 image. No consideration of LCD-only, CRT only, or simultaneous LCD and CRT display has been necessary before to set or select the VCLK given a single resolution mode.

The preferred embodiment uses the fourth register pair (SR0E/SR1E, with MISC[3,2] set to 1,1) during LCD-only mode. The values of SR0E and SR1E are setup so that the refresh rate is slower than CRT-only refresh could allow (i.e., slower than 45 Hz refresh). For example, display of an 800×600 image at 30 Hz refresh implies that the SR0E/SR1E pair is setup for about 20 MHz.

Setting Video Performance/Memory Interface Speed

1. Lower the video MCLK. MCLK is set by a single register, named SR1F. A higher value in this register indicates a faster Memory interface and subsequently higher video performance. MCLK is set to the value of SR1F (bits 5:0) times the input clock (14.318 MHz) divided by 8. A slow setting of 17 h in SR1f corresponds to 41 MHz MCLK (slow performance). A setting of 25 h corresponds to a setting of 66 MHz (high performance).

2. Set the core voltage to 3.3V when MCLK is below 50 MHz and VCLK is set below 77 MHz. The "PROG" pin (an output of the CL-GD7548) is connected to a FET to change the core voltage to the video controller. Changing from 5 volt operation to 3.3 volt operation (by changing the condition of the PROG pin) saves about 40% of the Video Graphics chip power. For low power mode, set bit 7 of CR30 to "0" for 3.3V operation of the core.

Exiting Low Power Mode
Restoring Full Performance Mode

If BIOS determines that full performance may be restored to the video controller, the steps used for power reduction are performed in reverse;

1. Core voltage set to 5 volts from 3.3 volts.
   To avoid exceeding the maximum voltage/frequency limits of the Cirrus device, the voltage should be changed first. The voltage change should occur ahead of the subsequent frequency changes. In this embodiment, Core voltage is set to 5V by setting bit 7 of CR30 to "1." The CPU then waits for 2 timer ticks (approximately 108 milliseconds) after changing the voltage before allowing the next change:

2. Set the memory clock to full.
   For the 7548, maximum MCLK is 66 MHz. Set SR1F to 25 h. This is done after the core voltage to the VGC has stabilized.

Restoring Full Refresh

Refresh rate must be set to "full" when displaying to a CRT. MISC [3,2] must be set to point to either of register pairs SR0B/1B, SR0C/1C, or SR0D/1D when an external CRT is being driven.

In the event that the resultant VCLK will be above 77 MHz, the core voltage to the VGC must first be changed to 5.0 volts (if it is at 3.3V already) with at least 100 milliseconds of stabilization time before the VCLK is changed to the high rate.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

It should also be noted that the disclosed innovative ideas are not limited only to ISA, EISA, or PCI systems, but can also be implemented in systems using other bus architectures.

It should also be noted that the disclosed innovative ideas are not limited only to systems based on an 80×86-compatible microprocessor, but can also be implemented in systems using 680×0, RISC, or other processor architectures, including, but not limited to, the PowerPC and PowerMAC systems.

It should also be noted that a future generation of Video graphics controllers may allow independent refresh rates to the internal LCD and to the external CRT (asynchronous timings). In this case, the above power conservation method would apply even when an external CRT is attached.

It should also be noted that the disclosed innovative ideas are not limited only to conventional LCD displays, but can alternatively and less preferably be applied to any portable display system where a slower refresh rate can improve power consumption.

It should also be noted that the disclosed innovative ideas are not by any means limited to systems using a single-processor CPU, but can also be implemented in small computers using multi-processor architectures.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A portable computer system with reduced power consumption, comprising:

a microprocessor;

a graphics controller connected to said microprocessor;

a video display connected to said graphics controller; and circuitry connected to detect when said portable computer system requires a reduced power mode;

wherein said graphics controller is connected to operate said video display at a first refresh rate during normal operation, and at a second refresh rate, non-zero and lower than said first refresh rate, when said circuitry detects that a reduced power mode is required.

2. The system of claim 1, wherein said circuitry is connected to at least one button which selects whether said reduced power mode is enabled or disabled.

3. The system of claim 1, wherein said circuitry is implemented by said microprocessor.

4. The system of claim 1, wherein said circuitry detects when a system power source has a critically low output value.

5. The system of claim 1, wherein said circuitry indicates that a reduced power mode has been selected at system start-up.

6. The system of claim 1, wherein said circuitry indicates that the state of said system is being stored to a non-volatile memory.

7. The system of claim 1, wherein said circuitry indicates that a "CPU IDLE" Advanced Power Management command has been issued.

8. The system of claim 1, wherein said circuitry includes a tick counter that determines if said CPU has been slowed.

9. A computer system comprising:

a user input device;

a microprocessor operatively connected to detect inputs from said input device;

memory which is read/write accessible by said microprocessor;

a video controller connected to said microprocessor;

a display operatively connected to display data generated by said video controller at a first refresh rate;

a power supply connected to provide power to said microprocessor, said memory, and said display, wherein said power supply comprises a battery;

wherein said display operates said display at a second refresh rate, lower than said first refresh rate, when said video controller receives a power conservation signal from said microprocessor.

10. The system of claim 9, wherein said microprocessor generates said power conservation signal when at least one user-selectable switch is activated.

11. The system of claim 9, wherein said circuitry comprises said microprocessor.

12. The system of claim 9, wherein said microprocessor generates said power conservation signal when said power supply has a critically low output value.

13. The system of claim 9, wherein said microprocessor generates said power conservation signal when a reduced power mode has been selected at system start-up.

14. The system of claim 9, wherein said microprocessor generates said power conservation signal when the state of said system is being stored to a non-volatile memory.

15. The system of claim 9, wherein said microprocessor generates said power conservation signal when a "CPU IDLE" Advanced Power Management command has be en issued.

16. The system of claim 9, wherein said microprocessor generates said power conservation signal when said microprocessor has been slowed.

17. A portable computer system with reduced power consumption, comprising:

a microprocessor;

a graphics controller connected to said microprocessor;

a video display connected to said graphics controller; and event detection circuitry connected to detect when said portable computer system requires a reduced power mode;

system circuitry connected to detect when any one of several system condition requires a normal refresh rate;

wherein said graphics controller is connected to operate said video display at a first refresh rate during normal operation, and at a second refresh rate, non-zero and lower than said first refresh rate, when said event detection circuitry detects that a reduced power mode is required.

18. The system of claim 17, wherein said event detection circuitry is connected to at least one button which selects whether said reduced power mode is enabled or disabled.

19. The system of claim 17, wherein said event detection circuitry is implemented by said microprocessor.

20. The system of claim 17, wherein said event detection circuitry detects when a system power source has a critically low output value.

21. The system of claim 17, wherein said event detection circuitry indicates that a reduced power mode has been selected at system start-up.

22. The system of claim 17, wherein said event detection circuitry indicates that the state of said system is being stored to a non-volatile memory.

23. The system of claim 17, wherein said event detection circuitry indicates that a "CPU IDLE" Advanced Power Management command has been issued.

24. The system of claim 17, wherein said event detection circuitry includes a tick counter that determines if said CPU has been slowed.

25. The method of claim 17, wherein one of said system conditions comprises the presence of a video master device.

26. The method of claim 17, wherein one of said system conditions comprises the presence of an application requiring a high video refresh rate.

27. A method for conserving power in a computer system, comprising the steps of:

operating a video display at a first refresh rate;

detecting whether any one of a set of events requiring video power conservation has occurred;

if one of said events has occurred, detecting whether any one of a set of system conditions requires said first refresh rate;

if no said system condition requires said first refresh rate, then operating said display at a second refresh rate, which is non-zero and lower than said first refresh rate;

if any said system condition requires said first refresh rate, then continuing to operate said display at said first refresh rate; and if no said event has occurred, then continuing to operate said display at said first refresh rate.

28. The method of claim 27, wherein one of said events comprises a user selection of said reduced power mode.

29. The method of claim 27, wherein one of said events comprises a detection that a method power source has a critically low output value.

30. The method of claim 27, wherein one of said events comprises a power-on-self-test selection of said reduced power mode.

31. The method of claim 27, wherein one of said events comprises an indication that the state of said method is being stored to a non-volatile memory.

32. The method of claim 27, wherein one of said events comprises a "CPU IDLE" Advanced Power Management command.

33. The method of claim 27, wherein one of said events comprises a tick counter that indicates that said CPU has been slowed.

34. The method of claim 27, wherein one of said system conditions comprises the attachment of a CRT display.

35. The method of claim 27, wherein one of said system conditions comprises the presence of a video master device.

36. The method of claim 27, wherein one of said system conditions comprises the presence of an application requiring a high video refresh rate.

37. The method of claim 27, further comprising the step of: when operating said display at said second refresh rate, detecting whether a system condition requires said first refresh rate; and if any said system condition requires said refresh rate, then operating said display at said first refresh rate.

38. A method for conserving power in a computer system, comprising the steps of:

operating a video display at a first refresh rate;

detecting whether any one of a set of events requiring video power conservation has occurred;

if one of said events has occurred, detecting whether any one of a set of system conditions requires said first refresh rate;

if no said system condition requires said first refresh rate, then operating said display at a second refresh rate, which is non-zero and lower than said first refresh rate;

if any said system condition requires said first refresh rate, then continuing to operate said display at said first refresh rate; and if no said event has occurred, then continuing to operate said display at said first refresh rate;

when operating said display at said second refresh rate, detecting whether a system condition requires said first refresh rate; and if any said system condition requires said refresh rate, then operating said display at said first refresh rate.

39. The method of claim 38, wherein one of said events comprises a user selection of said reduced power mode.

40. The method of claim 38, wherein one of said events comprises a detection that a method power source has a critically low output value.

41. The method of claim 38, wherein one of said events comprises a power-on-self-test selection of said reduced power mode.

42. The method of claim 38, wherein one of said events comprises an indication that the state of said method is being stored to a non-volatile memory.

43. The method of claim 38, wherein one of said events comprises a "CPU IDLE" Advanced Power Management command.

44. The method of claim 38, wherein one of said events comprises a tick counter that indicates that said CPU has been slowed.

45. The method of claim 38, wherein one of said system conditions comprises the attachment of a CRT display.

46. The method of claim 38, wherein one of said system conditions comprises the presence of a video master device.

47. The method of claim 38, wherein one of said system conditions comprises the presence of an application requiring a high video refresh rate.

* * * * *